(12) United States Patent
Oakes

(10) Patent No.: US 8,646,668 B2
(45) Date of Patent: Feb. 11, 2014

(54) STORAGE CONTAINER FOR A VEHICLE

(75) Inventor: Philip A. Oakes, Hilliard, OH (US)

(73) Assignee: Honda Motor Company, Ltd., Tokyo (JP)

( * ) Notice: Subject to any disclaimer, the term of this patent is extended or adjusted under 35 U.S.C. 154(b) by 831 days.

(21) Appl. No.: 12/537,386

(22) Filed: Aug. 7, 2009

(65) Prior Publication Data

US 2011/0031291 A1 Feb. 10, 2011

(51) Int. Cl.
*B60R 9/06* (2006.01)

(52) U.S. Cl.
USPC .......................... 224/401; 224/539; 224/488

(58) Field of Classification Search
USPC .......... 224/401, 484, 488, 502, 542, 544, 547, 224/539; 296/37.14, 37.1; 220/669, 675, 220/811, 812
See application file for complete search history.

(56) References Cited

U.S. PATENT DOCUMENTS

| | | | |
|---|---|---|---|
| 1,651,987 A | 12/1927 | Baker | |
| 3,165,222 A * | 1/1965 | Sentlinger | 220/628 |
| 3,799,483 A * | 3/1974 | Chiappinelli | 248/27.3 |
| 4,826,057 A * | 5/1989 | Yamada | 224/412 |
| 5,263,576 A * | 11/1993 | Boreen et al. | 206/455 |
| 5,381,940 A * | 1/1995 | Wright | 224/542 |
| 5,573,162 A | 11/1996 | Spencer et al. | |
| 5,636,890 A * | 6/1997 | Cooper | 296/37.1 |
| 5,667,092 A * | 9/1997 | Julius et al. | 220/259.1 |
| 5,799,845 A * | 9/1998 | Matsushita | 224/42.14 |
| 5,893,478 A * | 4/1999 | Maruoka | 220/827 |
| D417,647 S | 12/1999 | Jardine | |
| 6,029,841 A * | 2/2000 | Fotherby et al. | 220/23.87 |
| 6,056,176 A * | 5/2000 | Aftanas et al. | 224/321 |
| 6,179,180 B1 | 1/2001 | Walker | |
| 6,209,941 B1 | 4/2001 | Cross | |
| 6,250,529 B1 | 6/2001 | Babbitt et al. | |
| 6,634,691 B2 * | 10/2003 | Henderson | 296/37.6 |
| 6,641,013 B2 * | 11/2003 | Dise | 224/404 |
| 6,820,781 B1 | 11/2004 | Gardner | |
| 6,874,590 B2 | 4/2005 | Rondeau et al. | |
| 6,971,698 B1 * | 12/2005 | King | 296/37.13 |
| 7,004,365 B2 * | 2/2006 | Ingram | 224/401 |
| 7,044,526 B2 | 5/2006 | Tweet et al. | |
| 7,044,527 B2 * | 5/2006 | Maeda et al. | 296/37.1 |
| 7,097,224 B2 * | 8/2006 | Lester et al. | 296/37.14 |
| 7,128,341 B1 | 10/2006 | Dahl et al. | |
| 7,152,554 B2 | 12/2006 | Crawford | |
| 7,165,702 B1 | 1/2007 | Billberg | |
| 7,377,570 B2 | 5/2008 | Rondeau et al. | |

(Continued)

FOREIGN PATENT DOCUMENTS

EP 0538542 B1 3/1995

OTHER PUBLICATIONS http://www.containerstore.com/prowse/Product.jhtml?CATID=242&PROUDID=10015033, retreived on Sep. 29, 2008 (no longer available).

(Continued)

*Primary Examiner* — Adam Waggenspack
(74) *Attorney, Agent, or Firm* — Ulmer & Berne LLP

(57) ABSTRACT

A storage container for a vehicle is provided and includes a bottom wall and an outer wall extending upwardly from the bottom wall. The bottom wall and the outer wall together define a storage compartment. The storage container is configured to be removably secured to a rack of a vehicle.

16 Claims, 7 Drawing Sheets

(56) References Cited

U.S. PATENT DOCUMENTS

| | | |
|---|---|---|
| 7,390,046 B2 | 6/2008 | Ostroski et al. |
| 2003/0066853 A1 | 4/2003 | Hebert |
| 2004/0099703 A1 | 5/2004 | Schoenberger |
| 2004/0169388 A1 | 9/2004 | Bettin et al. |
| 2006/0011754 A1 | 1/2006 | Farmer |
| 2006/0237502 A1 | 10/2006 | Tweet et al. |
| 2007/0045368 A1 | 3/2007 | Lavelle |
| 2007/0181623 A1 | 8/2007 | Schneider |
| 2007/0257516 A1 | 11/2007 | Davis et al. |
| 2008/0174139 A1 | 7/2008 | Ostroski et al. |

OTHER PUBLICATIONS http://www.containerstore.com/browse/Product.jhtml?CATID=242&PRODID=10015033; retrieved on Sep. 26, 2008; 1 page.

http://www.containerstore.com/browse/Product.jhtml?CATID=242&PRODID=10020111; retrieved on Sep. 26, 2008; 2 pages.

* cited by examiner

STORAGE CONTAINER FOR A VEHICLE

TECHNICAL FIELD

The present invention relates generally to storage containers and more particularly to a storage container for a vehicle.

BACKGROUND

Various vehicles, such as all terrain vehicles, can include one or more storage racks mounted on the body of the vehicle. For example, known all terrain vehicles can include a first storage rack mounted on a front fender assembly of the vehicle and a second storage rack mounted on a rear fender assembly of the vehicle. Each of the storage racks can include a plurality of interconnected elongated members that define a plurality of openings.

The storage racks can be used to transport various items but can be subject to various disadvantages. For example, the size of the openings defined by the elongated members may preclude placing relatively small articles on the rack, such that the relatively small articles must be placed in a container that is larger than at least one of the openings. The container can then be secured to the rack with one or more straps, cords or the like. However, an operator of the all terrain vehicle may not have a storage container and/or straps, cords or the like readily available at the time the operator wants to store and transport one or more items.

SUMMARY

According to one embodiment, a storage container for a vehicle is provided that includes a bottom wall and an outer wall extending upwardly from the bottom wall. The outer wall includes an outer surface that defines a perimeter. The bottom wall and the outer wall together define a storage compartment. The storage container further includes a plurality of ribs spaced along the perimeter, with each of the ribs protruding outwardly away from the outer surface of the outer wall. Each of the ribs is shaped to engage an elongated member of a rack of a vehicle in a snap fit.

According to another embodiment, a storage assembly is provided that includes a rack, a storage container and means for removably securing the storage container to the rack. The rack is configured for attachment to the vehicle and includes a plurality of interconnected elongated members. The interconnected elongated members define a plurality of openings. The storage container includes a bottom wall and an outer wall extending upwardly from the bottom wall. The outer wall includes an outer surface that defines a perimeter of the storage container. The bottom wall and the outer wall together define a storage compartment. The storage container extends through one of the openings such that the rack circumscribes the storage container.

According to another embodiment, a vehicle is provided that includes a frame, a body supported by the frame, and a storage assembly that includes a rack, a storage container and means for removably securing the storage container to the rack. The rack is secured to at least one of the frame and the body. The rack includes a plurality of interconnected elongated members. The interconnected elongated members define a plurality of openings. The storage container includes a bottom wall and an outer wall extending upwardly from the bottom wall. The outer wall includes an outer surface. The outer surface defines a perimeter of the storage container. The bottom wall and the outer wall together define a storage compartment. The storage container extends through one of the openings such that the rack circumscribes the storage container.

According to another embodiment, a vehicle is provided that includes a body and a storage assembly. The body includes an upper surface having a first shape. The storage assembly includes a rack and a storage container. The rack is secured above the body and includes a plurality of interconnected elongated members. The interconnected elongated members define a plurality of openings. The storage container includes a bottom wall and an outer wall extending upwardly from the bottom wall. The outer wall includes an outer surface that defines a perimeter of the storage container. The bottom wall and the outer wall together define a storage compartment. The storage container extends through one of the openings such that the rack circumscribes the storage container. The bottom wall of the storage container includes a bottom surface having a second shape that is complementary to the first shape.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
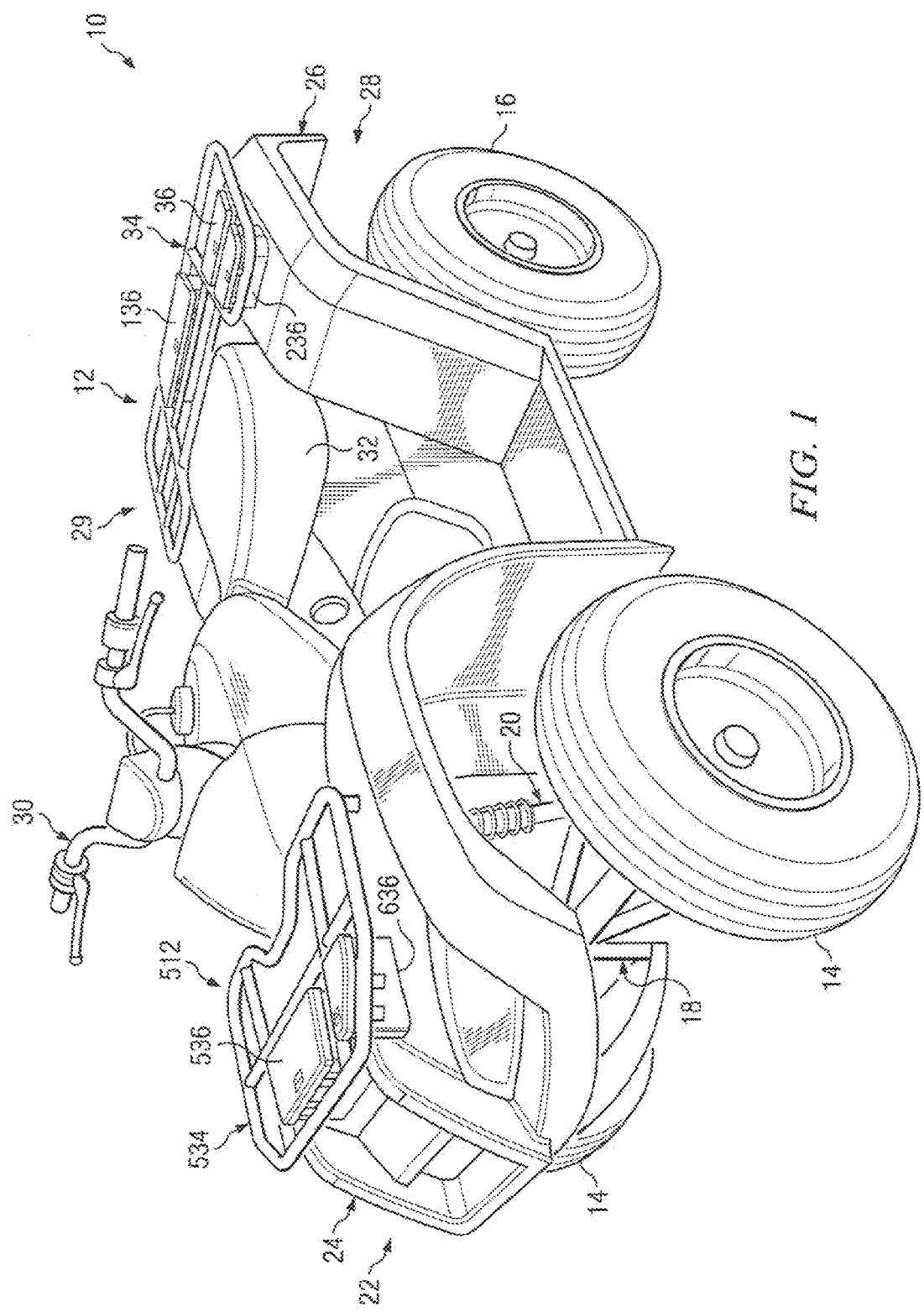
FIG. 1 is a perspective view of a vehicle that includes a storage assembly according to one embodiment secured to a forward portion of the vehicle and that also includes a storage assembly according to another embodiment secured to a rear portion of the vehicle.

Referring to the drawings, wherein like numbers indicate the same or corresponding elements throughout the views, FIG. 1 illustrates a vehicle 10 that includes a storage assembly 12 according to one embodiment and further includes a storage assembly 512 according to another embodiment. Storage assemblies according to the inventive principles can be used with an all terrain vehicle (ATV) such as vehicle 10 shown in FIG. 1, or with a variety of other land, water or other vehicles.

Vehicle 10 can include two front wheels 14 and two rear wheels 16 (one shown). The front wheels 14 and rear wheels 16 are suspended from a frame 18 and are rotatable relative to the frame 18. The front wheels 14 can be suspended from frame 18 using a variety of conventional suspension systems, such as suspension system 20 shown partially in FIG. 1. Vehicle 10 further includes a source of motive power (not shown), which can be an internal combustion engine and/or an electric motor or any other suitable source of motive power. The source of motive power is drivingly connected to a drivetrain (not shown) that is operable for transferring torque to the front wheels 14 and/or the rear wheels 16.

Vehicle 10 can also include a body 22 that can be supported by frame 18. The body 22 can include a front fender assembly 24 and a rear fender assembly 26. As shown in FIG. 1, with respect to the left front wheel 14 and the left rear wheel 16, the front fender assembly 24 can at least partially cover each of the front wheels 14 and the rear fender assembly 26 can at least partially cover each of the rear wheels 16. Vehicle 10 can further include a handlebar assembly 30 coupled to the front wheels 14, which can be used by an operator of vehicle 10 to steer the front wheels 14. Vehicle 10 can further include a seat 32 that can be used to support an operator of vehicle 10.

Figure 2:
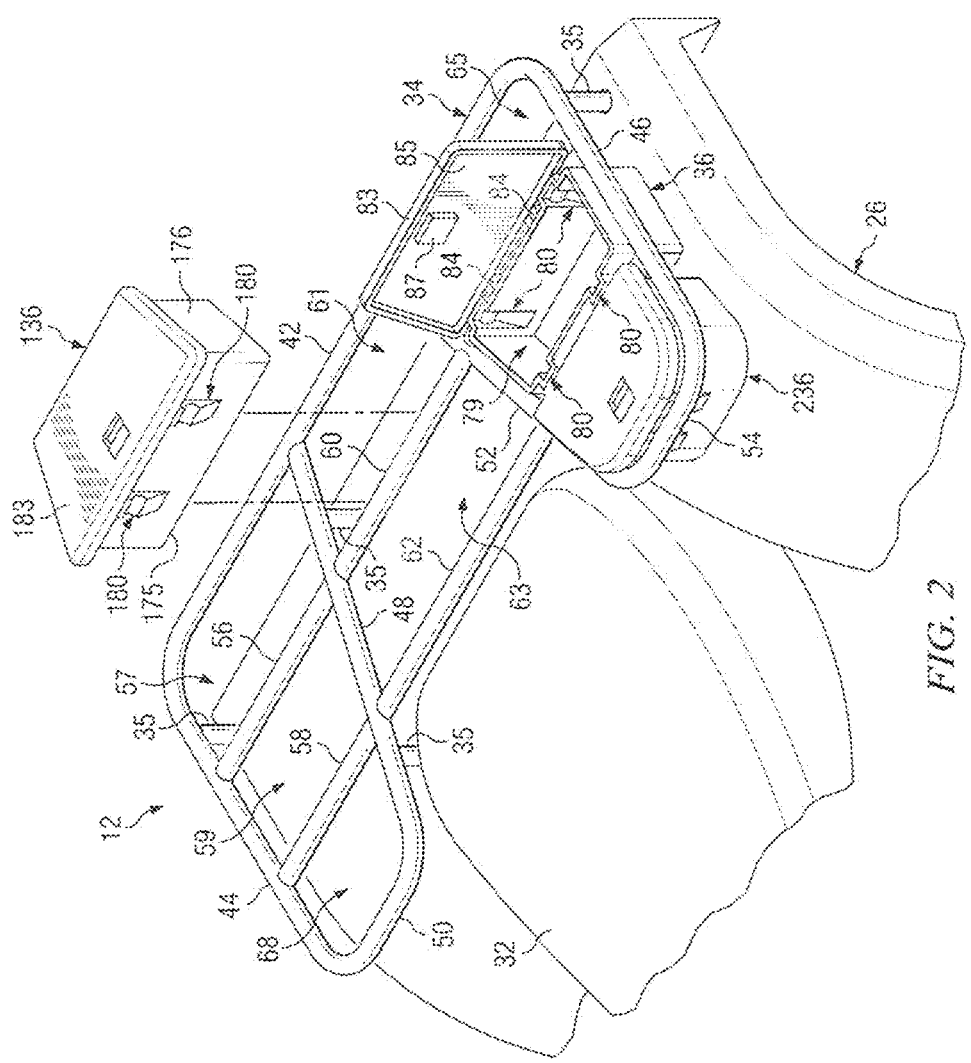
FIG. 2 is a fragmentary perspective view of the rear portion of the vehicle shown in FIG. 1 and the storage assembly secured to the rear portion of the vehicle, with one of the storage containers of the storage system shown in an exploded view.

Referring to FIGS. 1 and 2, the storage assembly 12 includes a rack 34 that can be secured to body 22 and/or the frame 18 of vehicle 10 with a plurality of stanchions 35 that can have various lengths to position and orient rack 34 as desired, for example to position rack 34 adjacent to and above the rear fender assembly 26 and orient rack 34 such that is substantially horizontal. Each of the stanchions 35 can be secured to rack 34 and to one or both of the body 22 and frame 18 of vehicle 10. The storage assembly 12 also includes one or more storage containers. For example, as shown in FIG. 2, the storage assembly 12 can include storage containers 36, 136 and 236, with each of the containers 36, 136 and 236 removably secured to rack 34. Various means can be used to secure storage containers to rack 34, as subsequently described.

Rack 34 can include a plurality of interconnected elongated members that define a plurality of openings, with each opening sized and shaped to accept a storage container. For example, as shown in FIG. 2, rack 34 can include a rear elongated member 42 and side elongated members 44, 46 that are each integral with the rear elongated member 42. Rack 34 can also include a generally longitudinally extending elongated member 48, a first forward elongated member 50 that interconnects members 44 and 48, a generally longitudinally extending elongated member 52 and a second forward elongated member 54 that interconnects members 52 and 46. Rack 34 can also include a plurality of generally laterally extending elongated members. For example, and with reference to FIGS. 2 and 7, rack 34 can include generally laterally extending elongated members 56, 58, 60, 62, 64 and 66. Members 56 and 58 can each interconnect members 44 and 48, members 60 and 62 can each interconnect members 48 and 52 and members 64 and 66 can each interconnect members 46 and 52. As shown in FIG. 2, the elongated members of rack 34 can define a plurality of openings, for example, openings 57, 59, 61, 63, 65 and 68, as well as two additional openings which can receive storage containers 36 and 236, respectively.

It will be appreciated with reference to FIGS. 1 and 2 that the elongated members of rack 34 can define a plurality of openings having a wide variety of shapes that can include polygonal shapes and non-polygonal shapes. It will be further appreciated that rack 34 can include a different number of elongated members, as compared to those shown in FIG. 2, that can define a different number of openings as compared to those shown in FIG. 2, and that the openings can have a variety of shapes. Each of the elongated members of rack 34 can be formed, for example by bending, from metal tubes having circular cross sections. Various metals can be used, that are resistant to corrosion, for example aluminum and steel, and that can be formed by bending. One or more of the elongated members of rack 34 can be made from a single tube. For example, one or more of the members 42, 44, 46, 48, 50, 52 and 54 can be formed from a single metal tube. In other embodiments, one or more of the elongated members of rack 34 can be made from solid metal rods or can be molded from various plastic materials. Various ones of the elongated members of rack 34 shown in FIG. 2 can be secured to other members of rack 34 by conventional means, such as welding. For example, the generally laterally extending elongated members 56 and 58 can each be welded to the side elongated member 44 and the generally longitudinally extending elongated member 48.

Figure 3:
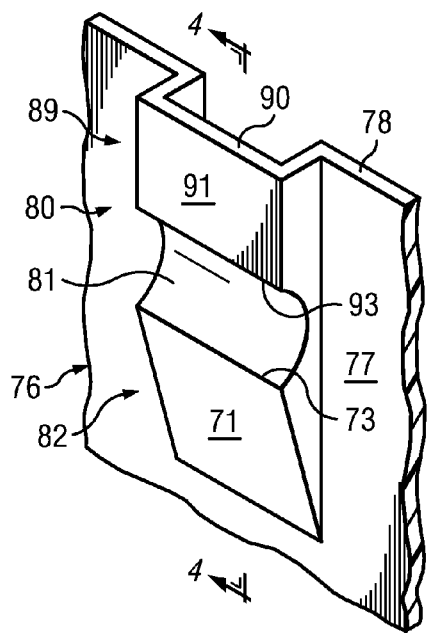
FIG. 3 is a fragmentary perspective view of a portion of one of the storage containers shown in FIG. 2 with the lid removed for clarity of illustration.
Figure 4:
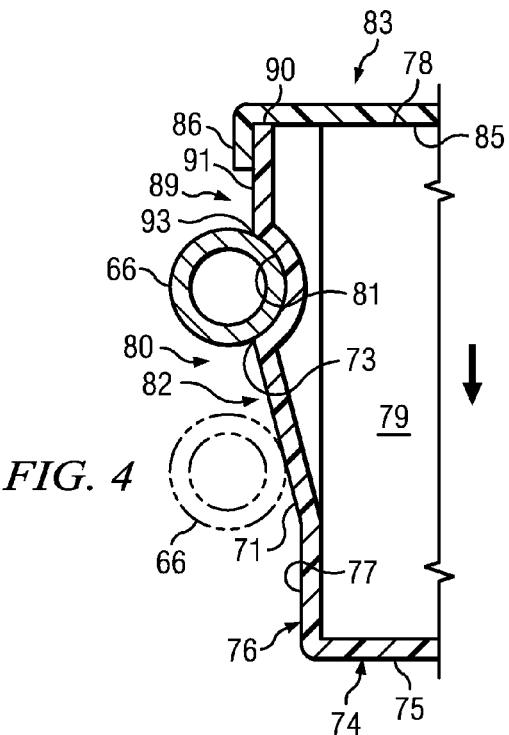
FIG. 4 is a cross-sectional view taken along line 4-4 in FIG. 3 of a portion of one of the storage containers, and a cross-sectional view of a mating one of the elongated members of the rack, of the storage assembly shown in FIG. 2, with a schematic, dashed line representation of the elongated member shown in a position prior to engaging the storage container in a snap fit, and with a lid of the storage container being depicted that is not shown in FIG. 3.

Referring to FIGS. 1-4, 7 and 8, the storage container 36 can include a bottom wall 74 and an outer wall 76 that extends upwardly from the bottom wall. The outer wall 76 includes an outer surface 77 and an upper edge surface 78. The outer surface 77 of the outer wall 76 defines a perimeter of the storage container 36. The bottom wall 74 and the outer wall 76 together define a storage compartment 79 (FIG. 2). Storage container 36 can also include a plurality of ribs 80 that are spaced along the perimeter of storage container 36, with each of the ribs 80 being shaped to engage one of the elongated members of rack 34 in a snap fit as shown in FIG. 4 with respect to one of the ribs 80 and the generally laterally extending elongated member 66 of rack 34. Each of the ribs 80 can include an outwardly facing indentation 81 that is shaped to engage one of the elongated members of rack 34 in a snap fit. Each of the ribs 80 can protrude outwardly away from the outer surface 77 of the outer wall 76. As shown in FIG. 3 with respect to one of the ribs 80, each of the indentations 81 can be an outwardly facing concave indentation such that each indentation 81 can engage an elongated member having a circular cross section, such as the elongated member 66, in a snap fit. Each of the ribs 80 can include an upper portion 89, which can include an upper edge surface 90 and an outer surface 91. For each of the ribs 80, the outwardly facing concave indentation 81 can cooperate with the outer surface 91 of the upper portion 89 to define a first edge 93.

Each of the ribs 80 can include a lead-in ramp 82 that extends away from and below a respective one of the indentations 81. The lead-in ramps 82 of ribs 80 can facilitate assembling the storage container 36 to rack 34. Each of the lead-in ramps 82 can include an outer surface 71 and, for each of the ribs 80, the outwardly facing concave indentation 81 can cooperate with the outer surface 71 of the lead-in ramp 82 to define a second edge 73. The first edge 93 and the second edge 73 can be at least substantially equidistant from the outer surface 77 of the outer wall 76 of the storage container 36, as shown in FIG. 4. The bottom wall 74, outer wall 76 and ribs 80 of storage container 36 can be made as a unitary structure from a suitable material. For example, the bottom wall 74, outer wall 76 and ribs 80 can be molded as a unitary structure from a suitable plastic material. The assembly of storage container 36 to rack 34 can be further appreciated with reference to FIG. 4 that illustrates the engagement of one of the ribs 80 with the elongated member 66. Initially, the storage container 36 can be positioned above the opening (not shown) that is defined by the elongated members 46, 52, 64 and 66, and then lowered such that the storage container 36 extends through this opening as shown in FIG. 2. Initially, the elongated member 66 engages the lead-in ramp 82 of each rib 80 that protrudes outwardly away from a forward portion of the outer surface 77 of the outer wall 76, as shown with respect to one of the ribs 80 and the dashed line representation of the elongated member 66 in FIG. 4. Since the storage container 36 can be made from a relatively resilient material, such as various plastic materials, each rib 80 can flex as the storage container 36 is pushed downward. This permits elongate member 66 to "ride up" ramp 82 and then engage the outwardly facing concave indentation 81 of each of the respective ribs 80 in a snap fit as shown in FIG. 4 with respect to one of the ribs 80.

Figure 8:
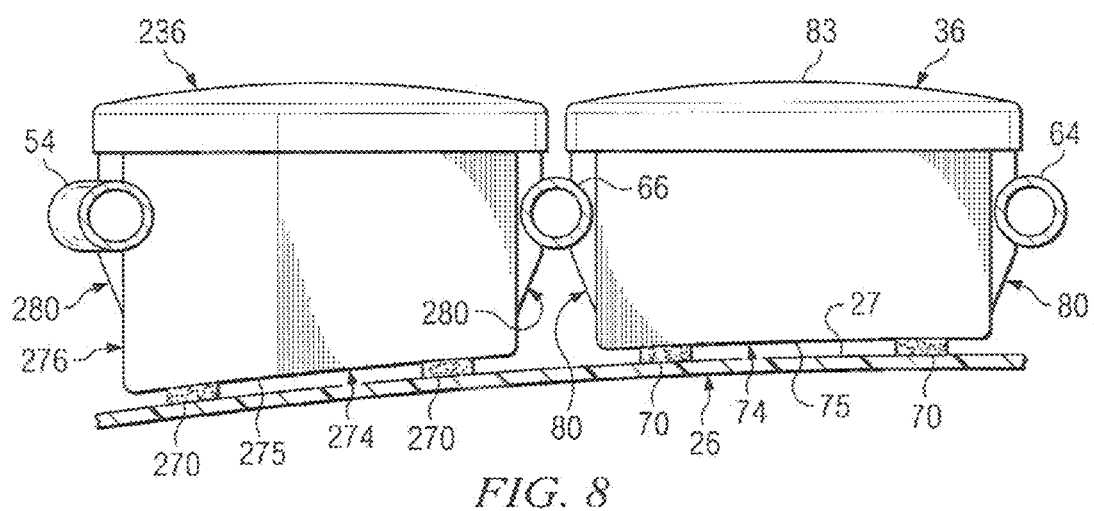
FIG. 8 is a cross-sectional view taken along line 8-8 in FIG. 7 and in association with the rear fender assembly of the vehicle shown in FIG. 1.

As shown in FIG. 2, a forward portion of the storage container 36 can include two of the ribs 80, with each of these ribs 80 engaging the elongated member 66 of rack 34 in a snap fit. A rear portion of the storage container 36 can also include one or more of the ribs 80 (two shown in FIG. 2) that can engage the elongated member 64 of rack 34 in a snap fit, as illustrated in FIGS. 2 and 8 with respect to one of the ribs 80. One or both of the side portions of the storage container 36 can include one or more of the ribs 80 (not shown) that can each engage a respective one of the elongated members 52 and 46 of the rack 34 in a snap fit.

Storage container 36 can include a plurality of feet 70 (FIG. 8) that are secured to the bottom wall 74 and extend below a bottom surface 75 of bottom wall 74. Feet 70 can be made from a resilient material and can be bonded to bottom wall 74 using an adhesive, or can be secured to bottom wall 74 in any other suitable manner. When the storage container 36 is removably secured to rack 34, feet 70 can contact an upper surface 27 of the rear fender assembly 26 of body 22 of vehicle 10. Vehicle 10 has a left side 28 and a right side 29 (FIG. 1). The upper surface 27 of the rear fender assembly 26 can have a laterally extending shape, shown in FIG. 8, between sides 28 and 29 of vehicle 10. The bottom surface 75 of storage container 36 can have a shape, in a lateral direction, that is complementary to the laterally extending shape of the upper surface 27 of the rear fender assembly 26 as shown in FIG. 8.

Storage container 36 can also include a lid 83 that is hingedly connected to the outer wall 76 of the storage container 34, for example by using one or more hinges 84 (FIG. 2). The lid 83 is selectively moveable between an open position shown in FIG. 2 and a closed position shown in FIG. 4. In the closed position, lid 83 closes the storage compartment 79, thereby protecting any articles stored within storage compartment 79 from the elements. Also, when lid 83 is in the closed position, an inner surface 85 of lid 83 can be in contacting engagement with the upper edge surface 78 of the outer wall 76 as shown in FIG. 4, and can be in contacting engagement with the upper edge surface 90 of the upper portion 89 of each of the ribs 80, as shown in FIG. 4 for one of the ribs 80. Lid 83 can protrude beyond the outer wall 76 and can include a downwardly extending lip 86, which can be in contacting engagement with the outer surface 91 of the upper portion 89 of each of the ribs 80 when the lid 83 is in a closed position, as shown in FIG. 4 for one of the ribs 80. Lid 83 can include a hand grip 87 which can be a recessed area that extends below the inner surface 85 of lid 83 as will be appreciated with reference to FIGS. 2 and 7. Hand grip 87 can be used by an operator to raise and lower lid 83. Also, in some embodiments, lid 83 can be latched to the outer wall 76 by one or more latch mechanisms (not shown) and, in this case, the hand grip 87 can also be used to facilitate lifting the storage container 36 out of the opening defined by the elongated members 46, 52, 64 and 66 and above rack 34.

Figure 5:
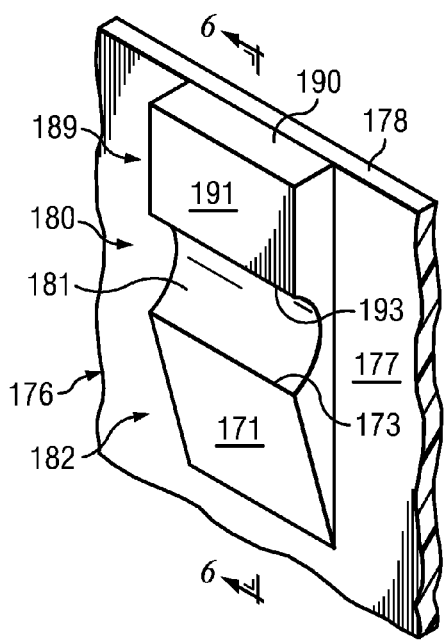
FIG. 5 is a fragmentary perspective view, similar to FIG. 3, of a portion of a storage container according to another embodiment.
Figure 6:
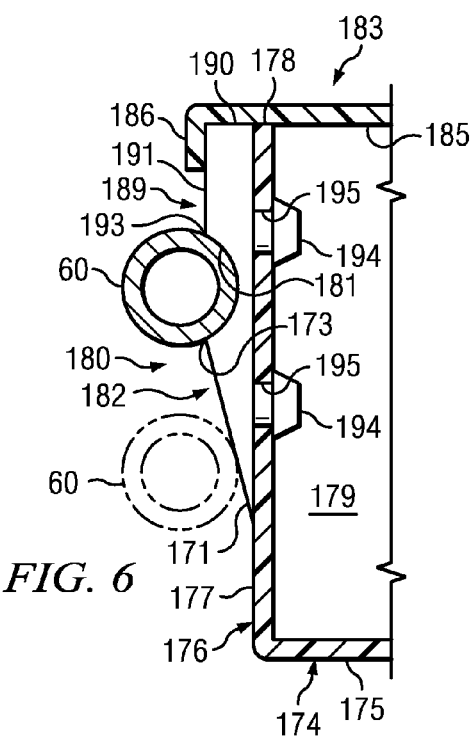
FIG. 6 is a cross-sectional view taken along line 6-6 in FIG. 5 of another one of the storage containers, and a cross-sectional view of a mating one of the elongated members of the rack, of the storage assembly shown in FIG. 2, with a rib of the storage container shown in elevation for clarity and with a schematic, dashed line representation of the elongated member shown in a position prior to engaging the storage container in a snap fit, and with a lid of the storage container being depicted that is not shown in FIG. 3.
Figure 7:
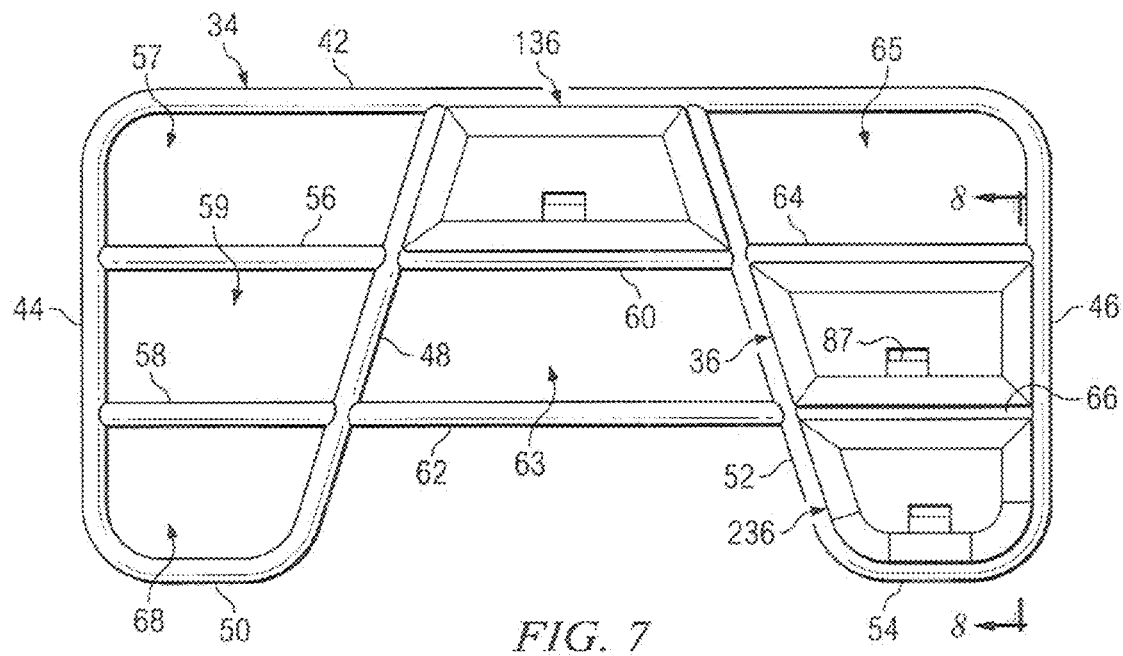
FIG. 7 is a top plan view of the rack of the storage assembly shown in FIG. 2.

As shown in FIGS. 1, 2, and 7, the storage assembly 12 can also include storage containers 136 and 236 and each can be removably secured to rack 34. Also, it will be appreciated that the storage assembly 12 can include additional storage containers that are not shown in FIGS. 1, 2 and 7. With reference to FIGS. 2, 5 and 6, the storage container 136 can include a plurality of ribs 180 that can be made separately from a bottom wall 174 and an outer wall 176 of storage container 136. The outer wall 176 can include an upper edge surface 178. Each of the ribs 180 can include an upper portion 189, which can include an upper edge surface 190 and an outer surface 191. Ribs 180 can be made from an elastomeric material, such as rubber or synthetic rubber, and can include one or more protrusions 194, with each of the protrusions 194 extending through a respective aperture 195 defined by the outer wall 176 of storage container 136. The protrusions 194 can compress as they pass through the respective aperture 195 and can then expand once the protrusions 194 extend beyond outer wall 176 within a storage compartment 179 of storage container 136. Accordingly, each protrusion 194 is effective for securing a respective rib 180 to the outer wall 176 of storage container 136. The bottom wall 174 and the outer wall 176 can be made from a plastic material as a unitary structure.

During assembly, the storage container 136 can be positioned above the rack 34 as shown in FIG. 2, and can then be lowered such that the storage container 136 extends through opening 61. Storage container 136 can be removably secured to rack 34. As shown in FIG. 2, the storage container 136 can include two of the ribs 180 secured to a forward portion of the outer wall 176. Each of these ribs 180 can each engage the elongated member 60 of rack 34 in a snap fit as shown in FIG. 6 with respect to one of the ribs 180. Each of the ribs 180 can include an outwardly facing concave indentation 181 that engages the elongated member 60 in a snap fit. Each of the ribs 180 can protrude outwardly away from an outer surface 177 of the outer wall 176. For each of the ribs 180, the outwardly facing concave indentation 181 can cooperate with the outer surface 191 of the upper portion 189 to define a first edge 193.

When the storage container 136 is lowered, the elongated member 60 can initially engage a lead-in ramp 182 of each of the ribs 180 secured to a forward portion of the outer wall 176 and then "ride up" the lead-in ramp 182 of each of these ribs 180 as the storage container 136 is pushed downward. During this process, each of the ribs 180 can compress, such that the indentation 181 of each rib 180 can engage the elongated member 60 in a snap fit. The lead-in ramp 182 can include an outer surface 171. For each of the ribs 180, the outwardly facing concave indentation 181 can cooperate with the outer surface 171 to define a second edge 173. The first edge 193 and the second edge 173 can be at least substantially equidistant from the outer surface 177 of the outer wall 176 of the storage container 136, as shown in FIG. 6. The storage container 136 can also include one or more additional ribs 180 (not shown) secured to the outer wall 176, with each of these additional ribs 180 engaging one of the elongated members 42, 48 and 52 in a snap fit. Storage container 136 can include a lid 183 that is selectively movable between an open position (not shown) and a closed position (FIG. 2). When the lid 183 is in a closed position, an inner surface 185 of the lid 183 can be in contacting engagement with the upper edge surface 178 of the outer wall 176, as shown in FIG. 6, and can be in contacting engagement with the upper edge surface 190 of the upper portion 189 of each of the ribs 180, as shown in FIG. 6 for one of the ribs 180. The lid 183 can protrude beyond the outer wall 176 and can include a downwardly extending lip 186, which can be in contacting engagement with the outer surface 191 of the upper portion 189 of each of the ribs 180, as shown in FIG. 6 for one of the ribs 180, when the lid 183 is in a closed position. The bottom wall 174 includes a bottom surface 175 that can have a shape, in a lateral direction, that is complementary to the laterally extending shape of the upper surface 27 of the rear fender assembly 26. Storage container 136 can include a plurality of feet (not shown) that extend below the bottom surface 175 and that can contact the upper surface 27 of the rear fender assembly 26 when the storage container 136 is removably secured to the rack 34.

The storage assembly 12 can also include a storage container 236 (FIGS. 1, 2 and 8) that is removably secured to the rack 34. The storage container 236 can include an outer wall 276 and a plurality of ribs 280 secured to outer wall 276. At least one of the ribs 280 can engage the elongated member 54 of rack 34 in a snap fit, and at least one other rib 280 can engage the elongated member 66 in a snap fit, as shown in FIG. 8. Storage container 236 can include a plurality of feet 270 that extend below a bottom surface 275 of a bottom wall 274 of storage container 236. The feet 270 can be made from a resilient material and can contact the upper surface 27 of the rear fender assembly 26 of vehicle 10 when the storage container 236 is removably secured to rack 234 as shown in FIG. 8. The bottom surface 275 of the bottom wall 274 can have a shape, in a lateral direction, that is complementary to the laterally extending shape, between sides 28 and 29 of vehicle 10, of the upper surface 27 of the rear fender assembly 26 as shown in FIG. 8.

Figure 9:
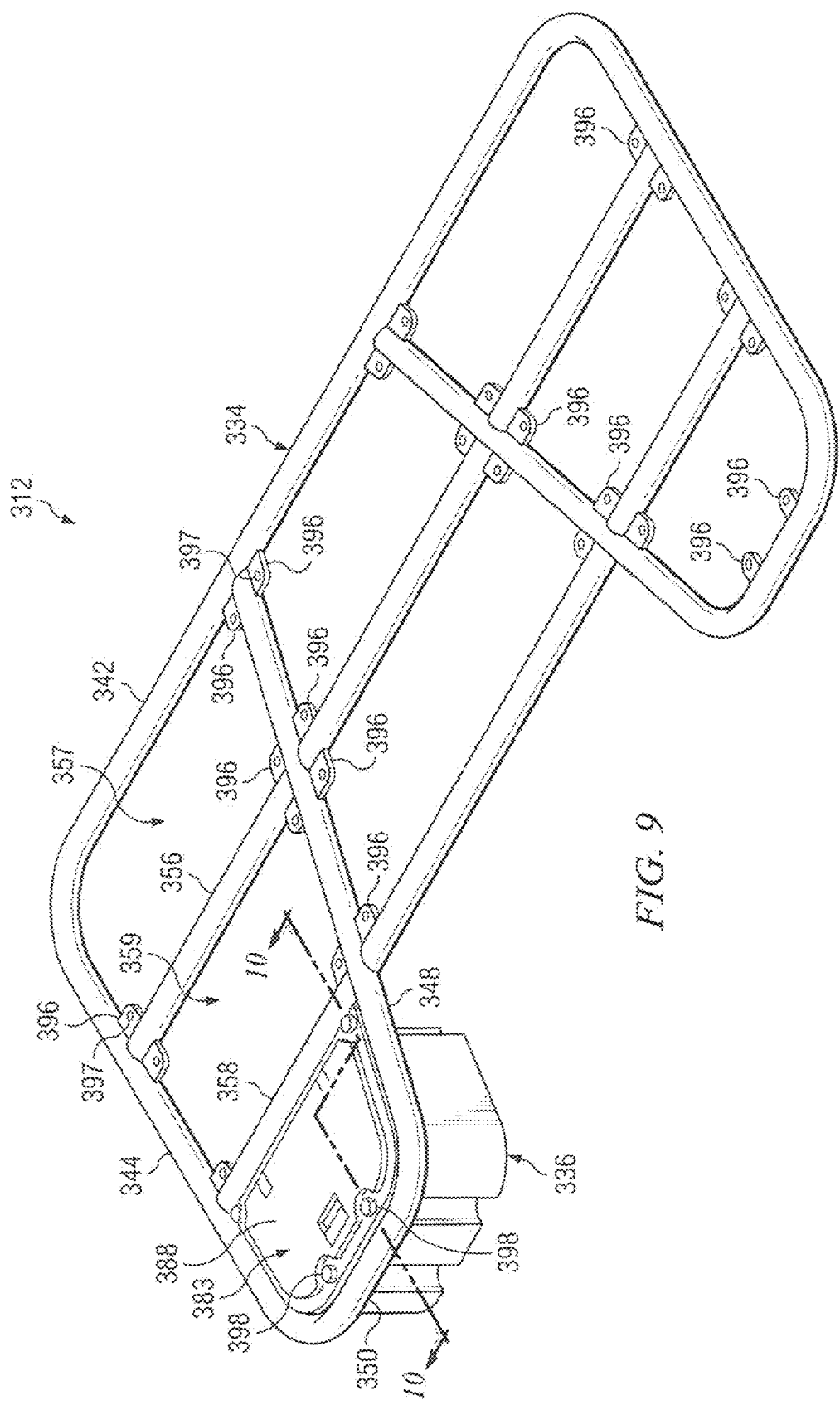
FIG. 9 is a perspective view of a storage assembly according to another embodiment.

Vehicle 10 can include a storage assembly 312 (FIG. 9) in lieu of storage assembly 12. The storage assembly 312 includes a rack 334 and one or more storage containers. The rack 334 can be secured to body 22 and/or frame 18 of vehicle 10 such that rack 334 is positioned adjacent to and above the rear fender assembly 26. As shown in FIG. 9, the storage assembly 312 can include a storage container 336 removably secured to rack 334, but it will be appreciated that the storage assembly 312 can include additional storage containers that are removably secured to the rack 334. The storage container 336 can be removably secured to rack 334 in a manner that is different than that described previously for removably securing the storage containers 36, 136 and 236 to rack 34. The rack 334 can include a plurality of interconnected elongated members that can include, for example, elongated members 342, 344, 348 and 350. Rack 312 can further include an elongated member 356 that interconnects members 344 and 348. Members 342, 344, 348 and 356 can cooperate to define an opening 357. Rack 354 can also include an elongated member 358 that also interconnects members 344 and 348. Elongated members 344, 348, 356 and 358 can cooperate to define an opening 359. The elongated members 344, 348, 350 and 358 can cooperate to define an opening (not shown) that can be sized and shaped to receive the storage container 336 such that the storage container 336 extends through this opening.

Figure 10:
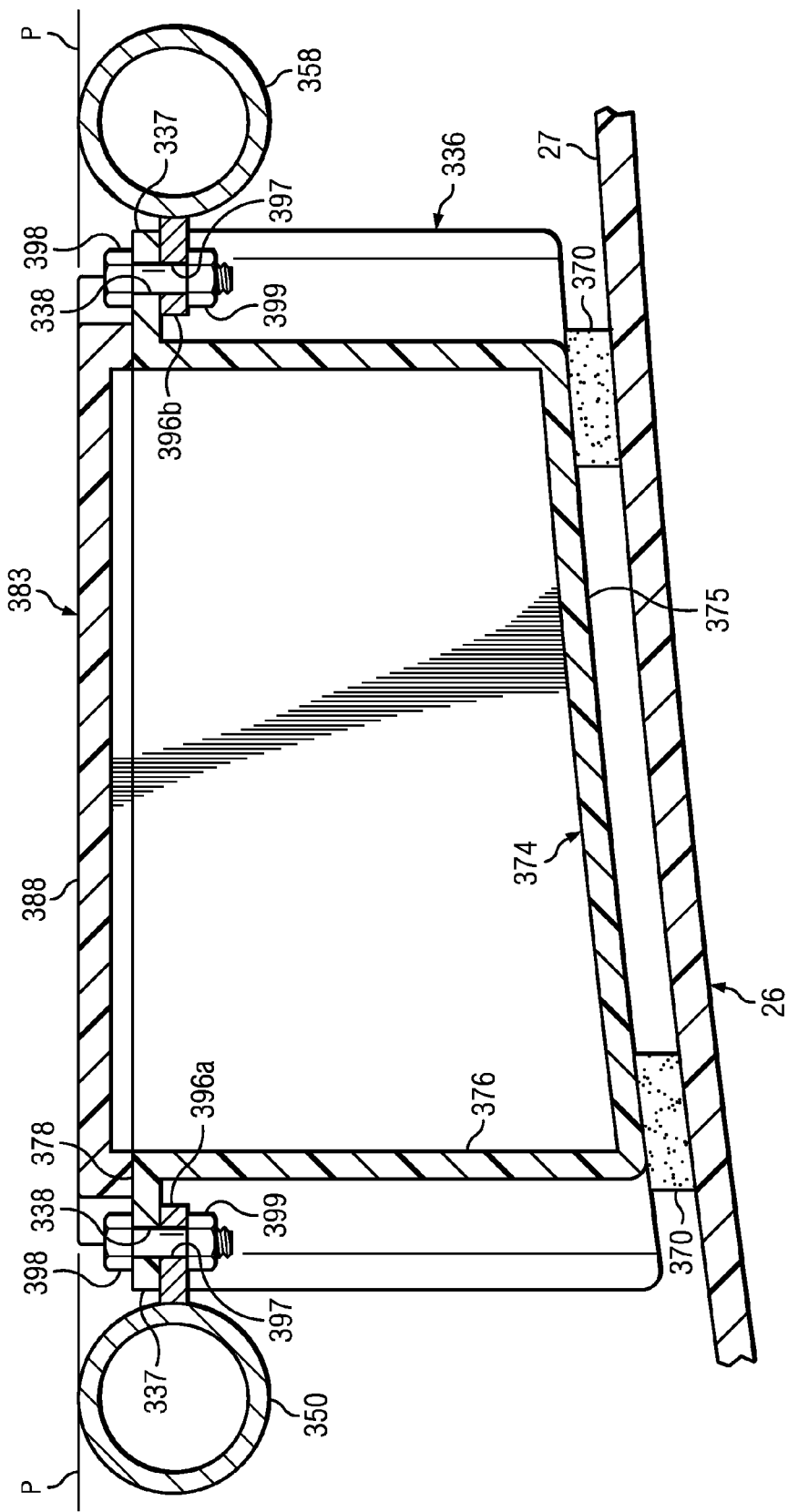
FIG. 10 is a cross-sectional view taken along line 10-10 in FIG. 9.

As shown in FIG. 9, rack 334 can include a plurality of tabs 396, with each of the tabs 396 being secured to one or more of the elongated members of rack 334 by conventional means such as welding, brazing, or any other suitable means. As shown in FIG. 10, one of the tabs designated 396a, can be secured to the elongated member 350 of rack 334. Another tab designated 396b, can be secured to the elongated member 358 of rack 334. Each of the tabs 396 can define an aperture 397 that is configured to receive a male fastener, such as bolt 398 as shown in FIG. 10.

The storage container 336 can include a bottom wall 374 and an outer wall 376 that extends upwardly from the bottom wall 374. Storage container 336 can include a plurality of tabs 337 that are integral with the outer wall 376 and extend outwardly from the outer wall 376 as shown in FIG. 10. Each of the tabs 337 can be substantially parallel with an upper edge surface 378 of the outer wall 376, as shown in FIG. 10. In one embodiment, the tabs 337 can be integrally formed with the bottom wall 374 and outer wall 376 as a unitary structure. For example, tabs 337, bottom wall 374 and outer wall 376 can be molded from a suitable plastic material. Each of the tabs 337 can define an aperture 338 that is aligned with the aperture 397 of a mating one of the tabs 396 of rack 334. Each bolt 398 can be inserted through the aperture 338 defined by the respective one of the tabs 337 and an aligned one of the apertures 397 defined by a mating one of the tabs 396. Bolts 398 can then be secured with female fasteners such as nuts 399 as shown in FIG. 10, which removably secures the storage container 336 to rack 334. Nuts 399 can be separate from tabs 396 of rack 334 or can be fixed to tabs 396, for example by welding nuts 399 to the respective tab 396. In another embodiment, tabs 396 can include threaded apertures that receive bolts 398. In this embodiment, nuts 399 are not required.

The interconnected elongated members of rack 334 can cooperate to define a plane P (FIG. 10) that is tangent to at least two of the elongated members. The plane P can be tangent to an uppermost point of at least two of the elongated members of rack 334, for example the uppermost point of each of the elongated members 350 and 358 as shown in FIG. 10. In one embodiment, plane P can be tangent to each of the elongated members that cooperate to define an opening, for example each of members 344, 348, 350 and 358 that cooperate to define the opening that receives the storage container 336. In another embodiment, plane P can be tangent with an uppermost point of each of the elongated members of rack 334 that cooperate to define multiple ones of the openings shown in FIG. 9. An upper surface 388 of a lid 383 can be co-planar with, i.e., lie within, plane P as shown in FIG. 10 or can be positioned below plane P. When the upper surface 388 of lid 383 is co-planar with plane P, additional items, i.e., in addition to those items that may be stored within storage container 336 and/or other storage containers secured to rack 334, can be positioned on top of and supported by rack 334 and storage container 336. Such additional items can also be supported by other storage containers secured to rack 334 that have an upper surface of a lid co-planar with plane P.

As shown in FIG. 10, the storage container 336 can include a plurality of feet 370 that are secured to a bottom wall 374 of container 336 and extend below a bottom surface 375 of the bottom wall 374. The feet 370 can be made of a resilient material and can contact the rear fender assembly 26 when the storage container 336 is removably secured to rack 334. The feet 370 can be bonded to the bottom wall 374 using an adhesive, or can be secured to bottom wall 374 in any other suitable manner. The bottom surface 375 of bottom wall 374 can have a shape, in a lateral direction, that is complementary to the laterally extending shape of the upper surface 27 of the rear fender assembly 26 as shown in FIG. 10.

Figure 11:
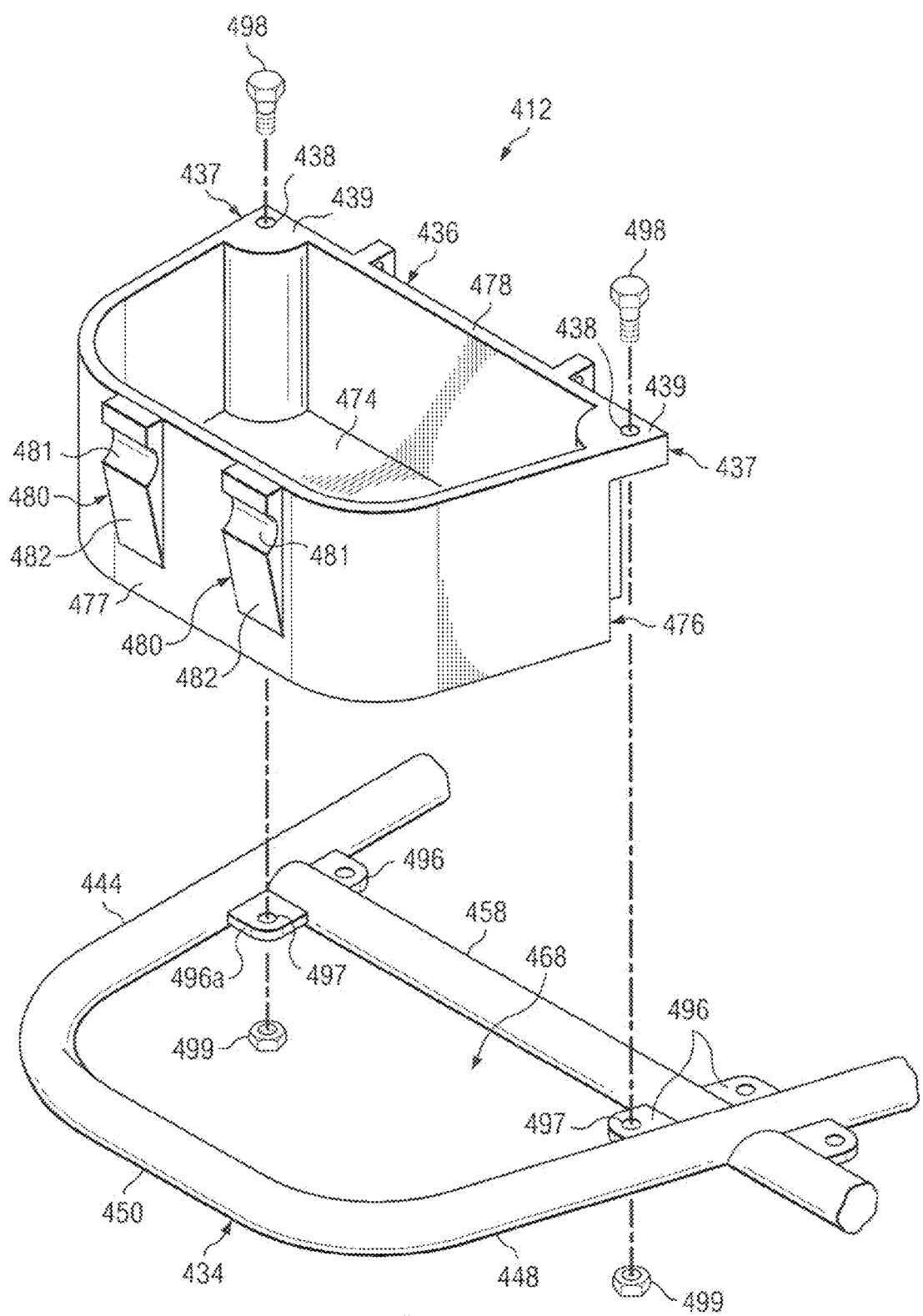
FIG. 11 is an exploded view of a portion of a storage assembly according to another embodiment, with one storage container and a portion of a mating rack being shown.

FIG. 11 illustrates a portion of a storage assembly 412 according to another embodiment. Storage assembly 412 includes a rack 434 (shown partially in FIG. 11) and a storage container 436. Rack 434 can include a plurality of interconnected elongated members, which can include elongated members 444, 448, 450 and 458. As shown in FIG. 11, members 450 and 458 can each interconnect members 444 and 448. Members 444, 448, 450 and 458 can cooperate to define an opening 468, which is configured to receive the storage container 436. Rack 434 can further include a plurality of tabs 496, with one designated 496a and with each tab 496 being secured to one or more of the elongated members by conventional means such as welding. For example, tab 496a can be secured to each of the elongated members 444 and 458.

The storage container 436 can be removably secured to the rack 434 using a combination of the previously described means for removably securing containers 36, 136 and 236 to rack 34 and the means for removably securing storage container 336 to rack 334. The storage container 436 can include a bottom wall 474 and an outer wall 476 that extends upwardly from the bottom wall 474, and can further include a plurality of ribs 480 that can be secured to a forward portion of the outer wall 476 and spaced along a perimeter of the storage container 436. Each of the ribs 480 can include one or more protrusions (not shown) that can be similar to or the same as the protrusions 194 of ribs 180 shown in FIG. 6 and that can be used to secure the respective rib 480 to the outer wall 476. Each of the ribs 480 protrudes outwardly from an outer surface 477 of the outer wall 476 and can include an outwardly facing concave indentation 481 that can engage the elongated member 450 in a snap fit. Each of the ribs 480 can also include a lead-in ramp 482 that can facilitate assembly of the storage container 436 to rack 434.

Storage container 436 can also include a plurality of tabs 437 that are integral with the outer wall 476 and extend outwardly from the outer wall 476. An upper surface 439 of each of the tabs 437 can be flush, and substantially parallel, with an upper edge surface 478 of the outer wall 476, as shown in FIG. 11. Each of the tabs 437 of storage container 436 can be fastened to respective ones of the tabs 496 and 496a of rack 434. For example, each of the tabs 437 can define an aperture 438 that can be aligned with an aperture 497 of a mating one of the tabs 496 and 496a of rack 434. Storage assembly 412 can include a plurality of bolts 498. Each bolt 498 can be inserted through one of the apertures 438 and an aligned one of the apertures 497 and can be secured by a nut 499, such that each tab 437 of storage container 436 is fastened to a mating tab 496 of rack 434 and the storage container 436 is removably secured to rack 434. Storage container can include a lid (not shown) that can be hinged to the outer wall 476.

Vehicle 10 can also include a storage assembly 512 (FIG. 1) that includes a rack 534 and one or more storage containers, for example storage containers 536 and 636 that can be removably secured to the rack 534. Rack 534 can be secured to body 22 and/or the frame 18 of vehicle 10 such that it is positioned adjacent to and above the front fender assembly 24. Each of the storage containers 536 and 636 can be removably secured to rack 534 using any of the means described previously, or equivalents thereof, for securing storage containers 36, 136, 236, 336 and 436 to the respective ones of racks 34, 334 and 434.

Storage containers according to the inventive principles can provide various advantages to an operator of a vehicle, such as an all terrain vehicle, that incorporates one or more racks. Relatively small items, which would otherwise fall through the openings of the rack, can be placed within one or more storage containers that are removably secured to the rack and can be protected from the elements by lids that selectively close a storage compartment of the respective storage container. The storage containers can have a wide variety of shapes, with each shape complementary to the shape of a respective one of the openings defined by the rack, which adds to the aesthetic appeal of the storage assembly and can facilitate maximizing the storage capacity of the storage container. Each storage container can include a bottom surface having a shape that is complementary to a shape of an upper surface of an adjacent portion, such as a fender assembly, of the vehicle, at least in a lateral direction. This can also facilitate maximizing the storage capacity of the storage container.

Since the storage containers can be removably secured to the rack of a vehicle, they can be provided on new vehicles or retrofitted to existing vehicles incorporating one or more racks without modifying the vehicle. Relative movement between each storage container and the associated rack can be prevented or at least inhibited while the respective storage container is removably secured to the rack, but each storage container can be removed easily. For example, in various embodiments the storage containers can include a plurality of ribs and each of the ribs can engage an elongated member of the rack in a snap fit. Such a storage container can be removed easily from the rack without the use of tools.

In other embodiments, the storage containers can be fastened to the rack and can be removed easily using simple and readily available tools. Use of the storage containers eliminates the need for the vehicle operator to locate straps, cords or the like to secure items to be transported by the vehicle.

In one embodiment, each storage container can be positioned such that additional items, i.e., in addition to those within the storage container(s), can be placed on top of the storage container(s) and supported by the storage container(s) and at least a portion of the rack surrounding the storage container(s), thereby increasing the vehicle's capacity to transport items.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and methods and illustrative examples shown and described. Accordingly, departures may be made from such details without departing from the scope and spirit of the general inventive principles.

What is claimed is:

1. A storage container for a vehicle comprising:
   a bottom wall;
   an outer wall extending upwardly from the bottom wall, the outer wall comprising an outer surface, the outer surface defining a perimeter, the bottom wall and the outer wall together defining a storage compartment;
   a lid hingedly connected to the outer wall, the storage compartment being selectively closed with the lid; and
   a plurality of ribs spaced along the perimeter, each of the ribs protruding outwardly away from the outer surface of the outer wall, each of the ribs comprising an upper portion, the upper portion comprising an outer surface and an upper edge surface, each of the ribs defining an outwardly facing concave indentation shaped to engage a respective one of a plurality of elongated members of a rack of a vehicle in a snap fit; wherein the outwardly facing concave indentation of each of the ribs is spaced from the outer surface of the outer wall and is defined solely by a respective one of the ribs;

each of the ribs comprises a lead-in ramp extending away from and below a respective concave indentation, the lead-in ramps facilitating assembly of the storage container to a rack of a vehicle; and when the lid is in a closed position, the lid is in contacting engagement with the outer surface and the upper edge surface of the upper portion of each of the ribs.

2. The storage container of claim 1, wherein:

the ribs, the bottom wall and the outer wall are made as a unitary structure, the outer wall further comprising an upper edge surface;

the lid comprises a downwardly extending lip and an inner surface; and when the lid is in a closed position, the downwardly extending lip is in contacting engagement with the outer surface of the upper portion of each of the ribs and the inner surface of the lid is in contacting engagement with the upper edge surface of the outer wall of the storage container.

3. The storage container of claim 1, wherein:

the ribs are made separately from the bottom wall and the outer wall and are secured to the outer wall, the outer wall further comprising an upper edge surface;

the lid comprises a downwardly extending lip and an inner surface; and when the lid is in a closed position, the downwardly extending lip is in contacting engagement with the outer surface of the upper portion of each of the ribs and the inner surface of the lid is in contacting engagement with the upper edge surface of the outer wall of the storage container.

4. The storage container of claim 3, wherein:

each of the ribs is made from an elastomeric material and comprises at least one protrusion;

the outer wall of the storage container defines a plurality of apertures; and the at least one protrusion of each of the ribs extends through a respective one of the apertures defined by the outer wall.

5. A storage assembly for a vehicle, the storage assembly comprising:

a rack configured for attachment to the vehicle, the rack comprising a plurality of interconnected elongated members, the interconnected elongated members defining a plurality of openings; and a storage container comprising a bottom wall and an outer wall extending upwardly from the bottom wall, the outer wall comprising an outer surface, the outer surface defining a perimeter of the storage container, the bottom wall and the outer wall together defining a storage compartment; wherein the storage container further comprises a plurality of ribs spaced along the perimeter of the storage container, each of the ribs protruding outwardly away from the outer surface of the outer wall of the storage container, each of the ribs defining an outwardly facing concave indentation engaged with the rack in a snap-fit;

the outwardly facing concave indentation of each of the ribs is spaced from the outer surface of the outer wall and is defined solely by a respective one of the ribs;

each of the ribs comprises an upper portion comprising an outer surface, and a lead-in ramp comprising an outer surface;

for each of the ribs, the outwardly facing concave indentation and the outer surface of the upper portion cooperate to define a first edge, and the outwardly facing concave indentation and the outer surface of the lead-in ramp cooperate to define a second edge, the first edge and the second edge being at least substantially equidistant from the outer surface of the outer wall;

the rack further comprises a first plurality of tabs, each of the first plurality of tabs being secured to at least one of the elongated members of the rack;

the storage container further comprises a second plurality of tabs, each of the second plurality of tabs being integral with the outer wall of the storage container, each of the second plurality of tabs being fastened to a respective one of the first plurality of tabs; and the storage container extends through one of the openings such that the rack circumscribes the storage container.

6. The storage assembly of claim 5, wherein:

the storage container further comprises a lid hingedly connected to the outer wall of the storage container, the storage compartment being selectively closed by the lid.

7. The storage assembly of claim 6, wherein:

at least some of the first plurality of tabs are secured to two of the elongated members of the rack.

8. The storage assembly of claim 6, wherein:

the upper portion of each of the ribs further comprises an upper edge surface; and when the lid is in a closed position, the lid is in contacting engagement with the outer surface and the upper edge surface of the upper portion of each of the ribs.

9. A vehicle comprising:

a frame;

a body supported by the frame; and a storage assembly comprising a rack and a storage container; wherein the rack is secured to at least one of the frame and the body, the rack comprising a plurality of interconnected elongated members and a first plurality of tabs, the interconnected elongated members defining a plurality of openings, each of the first plurality of tabs being secured to at least one of the elongated members of the rack;

the storage container comprises a bottom wall, an outer wall extending upwardly from the bottom wall, and a second plurality of tabs, the outer wall comprising an outer surface and an upper edge surface, the outer surface defining a perimeter of the storage container, the bottom wall and the outer wall together defining a storage compartment, the storage container extending through one of the openings such that the rack circumscribes the storage container;

each of the second plurality of tabs is integral with the outer wall and extends outwardly from the outer wall, each of the second plurality of tabs defining an aperture configured to receive a male fastener for fastening a respective one of the second plurality of tabs to a respective one of the first plurality of tabs;

each of the second plurality of tabs is substantially parallel with the upper edge surface of the outer wall;

the interconnected elongated members cooperate to define an upper plane that is tangent to at least two of the elongated members; and the storage container further comprises a lid having an upper surface and a lower surface, the upper surface being co-planar with the upper plane and the lower surface being in contacting engagement with the outer wall of the storage container when the lid is in a closed position.

10. The vehicle of claim 9, wherein:
the body comprises a front fender assembly and a rear fender assembly; and
the rack is secured adjacent to one of the front fender assembly and the rear fender assembly.

11. The vehicle of claim 10, wherein:
the storage container further comprises a plurality of feet secured to the bottom wall, at least one of the feet being disposed in contacting engagement with the one of the front and rear fender assemblies.

12. The vehicle of claim 11, wherein:
the vehicle further comprises a left side and a right side;
the one of the front fender assembly and the rear fender assembly comprises an upper surface having a first laterally extending shape between the left and right sides; and
the bottom wall of the storage container comprises a bottom surface having a second laterally extending shape that is complementary to the first laterally extending shape.

13. The vehicle of claim 9, wherein:
the second plurality of tabs are integrally formed with the bottom wall and the outer wall of the storage container as a unitary structure.

14. A vehicle comprising:
a body comprising an upper surface having a first shape; and
a storage assembly comprising a rack and a storage container; wherein
the rack is secured above the body, the rack comprising a plurality of interconnected elongated members and a first plurality of tabs, the interconnected elongated members defining a plurality of openings, each of the first plurality of tabs being secured to at least one of the interconnected elongated members; and
the storage container comprises a bottom wall and an outer wall extending upwardly from the bottom wall, the outer wall comprising an outer surface and an upper edge surface, the outer surface defining a perimeter of the storage container, the bottom wall and the outer wall together defining a storage compartment, the storage container extending through one of the openings such that the rack circumscribes the storage container;
the bottom wall of the storage container comprises a bottom surface having a second shape that is complementary to the first shape;
the storage container further comprises a second plurality of tabs and a plurality of ribs, the plurality of ribs being spaced along the perimeter of the storage container;
each of the second plurality of tabs is integral with, and extends outwardly from, the outer wall of the storage container, each of the second plurality of tabs defining an aperture configured to receive a male fastener for fastening a respective one of the second plurality of tabs to a respective one of the first plurality of tabs; and
each of the second plurality of tabs is substantially parallel with the upper edge surface of the outer wall;
each of the ribs protrudes outwardly away from the outer surface of the outer wall of the storage container, each of the ribs defining an outwardly facing concave indentation engaged with the rack in a snap-fit, the outwardly facing concave indentation of each of the ribs being spaced from the outer surface of the outer wall and defined solely by a respective one of the ribs.

15. The vehicle of claim 14, wherein:
the storage container further comprises a lid hingedly connected to the outer wall, the storage compartment being selectively closed by the lid; and
with respect to each of the ribs, the rib comprises a lead-in ramp extending away from and below the concave indentation, the lead-in ramp facilitating assembly of the storage container to the rack.

16. The vehicle of claim 14, wherein:
the storage assembly further comprises a plurality of the storage containers; and
at least some of the first plurality of tabs are secured to more than one of the elongated members of the rack.

* * * * *